(12) United States Patent
Kumkar et al.

(10) Patent No.: US 7,369,582 B2
(45) Date of Patent: May 6, 2008

(54) HIGH-POWER FIBER LASER AMPLIFIER AND FIBER LASER OSCILLATOR

(75) Inventors: Maite Kumkar, Schramberg (DE); Andreas Voss, Stuttgart (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 11/567,010

(22) Filed: Dec. 5, 2006

(65) Prior Publication Data
US 2007/0147442 A1    Jun. 28, 2007

Related U.S. Application Data

(63) Continuation of application No. PCT/EP2005/005970, filed on Jun. 3, 2005.

(30) Foreign Application Priority Data
Jun. 5, 2004    (DE)    ............ 10 2004 027 625

(51) Int. Cl.
    *H01S 3/30* (2006.01)
(52) U.S. Cl. ............................ 372/6; 372/70
(58) Field of Classification Search ............ 372/6, 372/70
    See application file for complete search history.

(56) References Cited

U.S. PATENT DOCUMENTS 5,696,782 A    12/1997    Harter et al.
5,818,630 A *  10/1998    Fermann et al. ....... 359/341.31
2007/0229939 A1 * 10/2007  Brown et al. ............ 359/341.1

FOREIGN PATENT DOCUMENTS

DE    10211352    9/2002
EP    1 030 416   8/2000

OTHER PUBLICATIONS

Carter et al., "The Road to Kilowatt Fiber Lasers", Proceedings of the SPIE—Conference on Optical Components and Materials, San Jose, CA, USA, Jan. 26-27, 2004, vol. 5350, No. 1, pp. 172-182.
Dominic et al., "110W Fibre Laser", Electronics Letters, IEE Stevenage, Great Britain, vol. 35, No. 14, Jul. 8, 1999, pp. 1158-1160.

(Continued)

*Primary Examiner*—Dung (Michael) T. Nguyen
(74) *Attorney, Agent, or Firm*—Fish & Richardson P.C.

(57) ABSTRACT

A high-power fiber laser amplifier with a laser wavelength of about 1060 to 1100 nm and an average laser power of more than about 500 W and an almost diffraction-limited beam quality ($M^2 < 1.5$) comprises a double-clad laser fiber that has a separate, laser-active fiber core with an outer diameter of at least 20 µm and a pump core that surrounds the fiber core and has an outer diameter of at least 50 µm, and ytterbium-doped solid state laser that emits pump light with a wavelength of approximately 1030 nm, a beam quality of $M^2 <$ of approximately 30 and a laser power of at least approximately 600 watts, for pumping the double-clad laser fiber.

38 Claims, 1 Drawing Sheet

OTHER PUBLICATIONS

Jackson et al., "Sequence lasing in a gain-switched $Yb^{3+}$-doped silica double-clad fiber laser", Applied Optics, Optical Society of America, Washington, USA, vol. 41, No. 9, Mar. 20, 2002, pp. 1698-1703.

Tankala et al., "PM double-clad fibers for high power lasers and amplifiers", Proceedings of the SPIE—Conference Advances in Fiber Lasers, San Jose, CA, USA, Jan. 27-28, 2003, vol. 4974, 2003, pp. 220-229.

Tsang et al., "Efficient high power $Yb^{3+}$-silica fibre laser cladding-pumped at 1064 nm", Optical Communications, North-Holland Publishing Co., Amsterdam, NL, vol. 215, No. 4-6, Jan. 15, 2003, pp. 381-387.

Copy of International Search Report for corresponding PCT application serial No. PCT/EP2005/005970, 3 pages.

* cited by examiner

HIGH-POWER FIBER LASER AMPLIFIER AND FIBER LASER OSCILLATOR

RELATED APPLICATIONS

This application is a continuation of, and claims priority under 35 U.S.C. §120 to PCT/EP2005/005970, filed on Jun. 3, 2005, and designating the U.S., and claims priority under 35 U.S.C. §119 from German application no. DE 10 2004 027 625.0, filed Jun. 5, 2004. Both of these priority applications are hereby incorporated by reference in their entirety.

TECHNICAL FIELD

The present invention relates to a high-power fiber laser amplifier, a corresponding fiber laser oscillator, and a laser processing machine including such a fiber laser oscillator.

BACKGROUND

In accordance with the present state of the art, continuous laser radiation with an almost diffraction-limited beam quality can be obtained by individual laser diodes with small output powers (i.e., <1 W). Power sealing by coherent coupling of many diodes is possible for small output powers.

Solid state lasers that are pumped with laser diodes are currently used to produce higher fundamental mode powers with good electro-optical efficiency (i.e., 10-30%) in a spectral range around 1 μm. Pumping sources of reasonable brilliance can already realize an efficient fundamental mode operation by using laser transitions with small thermal occupation of the lower laser energy level (so-called four-level systems) and sufficient durability of the upper laser energy level and sufficiently large absorption and emission cross-sections. One decisive criterion in this connection is that only small thermo-optical effects (i.e., "thermal lens") occur in the laser-active medium. When laser-active media of rod-shaped or cuboid geometries are used, this is guaranteed only up to approximately 5 to 20 W output power per laser-active element. For fundamental mode powers of more than approximately 20 W per crystal, a rod laser can produce fundamental mode operation only with reduced efficiency and reduced dynamic stability range due to thermo-optical effects. With thoroughly homogenized pump light distribution, a side-pumped Nd:YAG rod achieves a maximum fundamental mode power of around 80 W with an optical-optical efficiency of approximately 20%.

It is possible to obtain a fundamental mode power of more than 100 W from a single laser-active medium having good efficiency (i.e., >40% optical-optical) by means of a laser-active medium of optimized geometry. Either a disc laser or a fiber laser are suitable for this purpose. The thermal-optical effects of the disc laser are considerably reduced due to its axial thermal flow, parallel to the resonator radiation, and its extremely short optical path, while the fiber laser is insensitive to thermal-optical effects due to wave guidance of the laser radiation. Both geometries require a relatively high pump radiation brilliance; a typical value for a Yb:YAG disc laser is approximately 5 kW/(mm·rad)$^2$, whereas a unilaterally end-pumped fiber laser with 100 W output power, a typical pump core diameter of 0.4 mm and a numerical aperture of 0.45 requires approximately 20 kW/(mm·rad)$^2$. The output power is scaled in the disc laser with approximately constant pump radiation brilliance, wherein the diffraction-limited beam quality can be maintained with good efficiency only up to approximately 200 W. The output power of the fiber laser can be doubled to approximately 200 W through pumping at both sides with the same pump light brilliance. The output power of the fiber laser can be further increased, and an increase in output power requires a proportional increase of the pump light brilliance if the diameter and the numerical aperture of the pump core are kept constant. Thus, high-power fiber laser with output powers of more than 500 W and an almost diffraction-limited beam quality put very high demands on the brilliance of the pump light source(s). The requirements with regards to brilliance can be reduced by increasing the numerical aperture of the pump core by increasing the pump core diameter.

Conventional high-power fiber lasers are end-pumped with laser diode arrays having complex beam shapes and a high brilliance. The wavelength of the pump light is usually about 980 or 915 nm. The required pump light brilliance increases with increasing output power, which also increases the expense for shaping the beams of the laser diodes. High-power laser diode arrays ("stacks") with good fast-axis collimation have a brilliance of approximately 10-20 kW/(mm·rad)$^2$ such that further measures are used to increase the brilliance of a diode-pumped fiber laser with 1 kW output power by approximately five to ten times. For example, the further measures can include polarization coupling, slow-axis collimation, and wavelength multiplex. Due to the required multi-stage optical transformations, the electro-optical efficiency of these pump light sources with high brilliance is considerably smaller than that of a simple pump light source. At the same time, the required optical expense greatly increases the costs of the pump light sources.

SUMMARY

In some general aspects, a high-power fiber laser amplifier is developed to have an average power of more than about 500 W, while requiring no complex pump light beam shaping, and while achieving an almost diffraction-limited beam quality in the stable fundamental mode operation.

In some implementations, a fiber laser amplifier having a laser wavelength of 1060 to 1100 nm and an average laser power of more than 500 W includes a double-clad laser fiber having a separate laser-active fiber core of an outer diameter of at least 20 μm and a pump core surrounding the fiber core and having a outer diameter of at least 50 μm. The fiber laser amplifier includes a ytterbium-doped solid state laser that emits pump light with a wavelength of approximately 1030 nm, has a beam quality of $M^2$<about 30 and a laser power of at least about 600 watts, for pumping the double-clad laser fiber.

The use of optically excited high-power solid state lasers as a pumping source is advantageous in that the available brilliance of the pump light of the high-power solid state laser of more than 5 MW/(mm·rad)$^2$ is considerably higher than the required minimum value for the high-power fiber laser. The use of laser fibers with a separate pump core and a laser-active fiber core (so-called double-clad fibers) allows the use of pump light that has a considerably lower brilliance than the laser radiation at the fiber output. While single mode fibers require pumping into the laser-active core already with diffraction-limited beam quality, double-clad fibers permit the use of multi-mode solid state lasers as a pumping source and therefore higher output powers of pump radiation. The double-clad fibers moreover allow coupling of a higher pumping power into the laser fiber without destroying the laser fiber due to an excessive power density in the laser-active core.

The pump core of the double-clad fiber is typically considerably larger (approximately 2 to 50 times larger) than the active single mode fiber core. The pump core moreover has a numerical aperture that is approximately 2 to 10 times larger than the single-mode core. In total i.e., due to the larger core diameter in connection with the higher numerical aperture or the pump core, the use of the separate pump core reduces the demands on the beam quality of the pump light typically by a factor of 10 to 200 compared to direct pumping into a single-mode fiber core.

In order to avoid or reduce non-linear effects (e.g. the Raman effect) that occur at high laser powers in the laser fiber, it is desired to keep the fiber length as short as possible. In order to nevertheless limit generation of heat per unit of length in the laser fiber, the relative heat production (heat output related to the pumping power) in the laser fiber must be minimized. In order to obtain high pump light absorption and at the same time minimum development of heat, the quantum defect (stokes shift) between the longitudinal wavelength of the pump radiation and the longitudinal wavelength of the laser radiation can be reduced or minimized. Towards the end, a solid state laser that emits at approximately 1030 nm, in particular a diode-pumped Yb:YAG disc laser, can be used as a pump light source for a laser fiber that is doped, e.g., with ytterbium, having an emission wavelength of 1060 to 1100 nm. With a pump wavelength of 1030 nm and an emission wavelength of 1080 nm, the relative heat development is merely 4.6% (without taking into consideration the parasitic loss, e.g., due to non-radiating effects). Due to the small quantum defect, the fiber laser is highly efficient and a differential optical-optical efficiency of more than 80% can be obtained.

When a Yb:YAG solid state laser is used, one obtains a pump wavelength of approximately 1030 nm. This wavelength is suited for pumping a fiber laser amplifier with ytterbium or neodymium-doped quartz glass as a laser-active fiber core. The absorption cross-section of the ytterbium or neodymium-doped fiber laser amplifier is indeed considerably smaller at 1030 nm compared to the hitherto used pump wavelengths of 980 nm and 915 nm for ytterbium and 808 for neodymium. This is, however compensated for in that, when a pumping source with good beam quality and high brilliance is used, in particular a disc laser, the pump core diameter of the laser fiber can be small. The amount of heat generated in the fiber during pumping with 1030 nm is only approximately half the amount that is generated during pumping with 980 nm. Since excitation is not effected from the basic state but from a level with relatively little thermal occupation, the absorption of the pump light considerably increases with increasing temperature. The spontaneous emission (fluorescence) that is very distinct in a quasi three-level system requires additional pumping power that faces no useful power. If the pump wavelength is shorter than the average fluorescence wavelength, like in conventional pump transitions from the basic state, this represents an additional thermal load on the laser-active medium. If, however, the fluorescent radiation has a shorter wavelength than the pump radiation—like in the inventive fiber laser with Yb:quartz glass pumped at 1030 nm as the laser active medium—this results in cooling the laser medium, and cooling of the laser medium reduces thermal load.

The use of a high-power solid state laser with a wavelength of 1030 nm and a high beam quality measured in part by the beam quality factor $M^2<30$ for pumping a double-clad laser fiber with a laser wavelength of 1060 to 1100 nm has the following advantages. The output power of the fiber laser amplifier is not limited by the maximally possible brilliance of the pumping source. While the wavelength of laser diodes is subjected to considerable statistical and dynamic fluctuations due to production tolerances and changes in semiconductor temperature (heating through power loss, coolant temperature), the wavelength of the solid state pump laser is comparatively stable. The spectral emission width of the solid state laser is also considerably smaller than that of the typical high-power laser diodes. Thus, the absorption of the solid state laser radiation in the laser fiber is more constant and typically higher than that of laser diodes of the same nominal wavelength. The fiber laser can be designed at less cost and be operated more efficiently by using the more stable pumping source. Unilateral end-pumping of the fiber laser amplifier is possible due to the high power density of the pump laser. The small quantum defect keeps the thermal load on the laser fiber within a tolerable range (e.g., <100 W/m) even with high pumping power and small fiber length, such that the laser fiber is not destroyed, and a high optical-optical efficiency is obtained.

Due to the high beam quality of the pump laser, the pump core diameter of the laser fiber can be small, which provides good light absorption and reduces the costs of the fiber laser amplifier.

The high pumping power density of the Yb:YAG solid state laser and the resulting high pump light absorption of the laser fiber allow short fiber lengths and therefore delimit undesired non-linear effects in the laser fiber.

The high beam quality of the pump laser allows a small numerical aperture of the pump core so that quartz glass can be used as pump core cladding. This improves the low loss of the fiber laser and increases its resistance to high pumping power densities, and therefore its reliability.

The risk that the laser fiber is destroyed through amplitude fluctuations, e.g., through feedback from a connected laser light cable or from the material processing procedure is reduced, since the amplification in the laser medium of the solid state laser amplifier is limited due to fading absorption with high pumping power density. The fading is clearly pronounced due to pumping directly into the upper laser energy level. Thermal occupation of the lower laser energy level additionally also reduces amplification.

If a Q-switched solid state laser is used as pumping laser, energy can be stored in the pumping laser. This achieves high peak power of the pumping source with moderate diode (peak) power.

The pump laser can alternatively also be used directly for processing material, in which it is possible to switch very quickly (i.e., <100 ms) between processing with the pump laser and the fiber laser.

The solid state laser can be a diode-pumped Yb:YAG disc laser and the fiber core can be made of quartz glass that is doped either completely or partially with laser-active ions, preferably neodymium3+ and/or ytterbium3+. If the fiber core contains no further doping except for the laser-active ions, the loading capacity of the fiber is also maximized or increased.

Alternatively, the fiber core can be completely or partially doped with further ions, e.g., $Ge^{4+}$ or $F^-$, in addition to the laser-active ions, in order to obtain the desired difference in relative indices between the laser-active fiber core and the pump core.

The pump core that surrounds the laser-active fiber core can be made of quartz glass that can be completely or partially doped with ions, in particular $GE^{4+}$ or $F^-$ and/or can contain periodically arranged air-filled cavities, in order to obtain a desired difference in refractive indices between the laser-active fiber core and the pump core.

The double-clad laser fiber can include a quartz glass cladding that surrounds the pump core, and the quartz glass cladding can be completely or partially doped with ions, e.g., F−, and/or can contain periodically arranged air-filled cavities in order to obtain a desired numerical aperture of the pump core.

In some implementations, the outer diameter of the laser-active fiber core is smaller than approximately 50 μm and the outer diameter of the pump core is smaller than 300 μm, and can be smaller than 200 μm. The quartz glass cladding that surrounds the pump core can have an outer diameter of between 100 μm and 600 μm, and can have an outer diameter of between 100 μm and 400 μm. The numerical aperture of the pump core is between 0.15 and 0.7, and can be between 0.2 and 0.35.

In order to substantially maintain the polarization of the radiation that is coupled into the fiber core and amplified, structures that are not rotationally symmetric and induce a tension can be introduced in the laser fiber.

In order to substantially maintain the polarization of the radiation that is coupled into the fiber core and amplified, structures that are not rotationally symmetric and induce a tension can be introduced in the laser fiber.

In some implementations, the ytterbium-doped solid state laser is coupled to the double-clad laser fiber through a (passive) optical fiber.

A tilted dichroic mirror can be disposed in the path of rays between the solid state laser and the laser fiber, such that reflected radiation from the laser fiber does not get into the pump laser. The dichroic mirror can be used for both coupling the radiation that is to be amplified into the fiber core and decoupling the radiation that has been amplified out of the fiber core.

The ytterbium-doped solid state laser can be modulated, e.g., Q-switched, in order to achieve high laser output radiation peak powers.

The inventive fiber laser amplifier can be used as a fiber laser oscillator together with suitable resonator mirrors. The resonator mirrors can be designed as a fiber Bragg grating of the laser fiber. Alternatively, one of the resonator mirrors can be identical with the dichroic mirror in order to protect the pump laser from radiation feedback.

The invention also relates to a laser-processing machine with a fiber laser oscillator of the above mentioned design, as a processing laser. This improves the beam quality, preferably obtaining an almost diffraction-limited beam quality (fundamental mode, $M^2<1.5$) for lasers with an average power of more than 500 W. Advantageously, the solid state laser of such a laser processing machine can also be directed used as processing laser.

Further advantages of the invention can be extracted from the description and the drawing. The features mentioned above and below can be utilized individually or collectively in arbitrary combination. The embodiments shown and described are not to be understood as exhaustive enumeration but have exemplary character for describing the invention.

DETAILED DESCRIPTION

Figure 1:
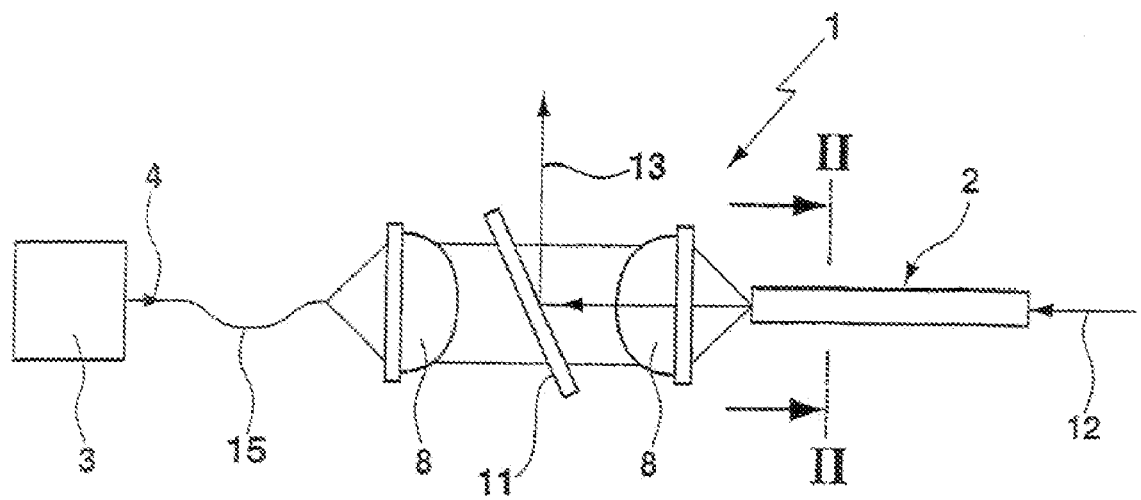
FIG. 1 shows a schematic drawing of a high-power fiber laser amplifier.

Referring to FIG. 1, a high-power fiber laser amplifier 1 includes a double-clad laser fiber 2 and a solid state laser 3 for pumping the double-clad laser fiber 2.

The solid state laser 3 is a diode-pumped ytterbium-doped disc laser that emits pump light 4 with a wavelength of approximately 1030 nm, a beam quality of $M^2<30$ and a laser power of at least 100 watts.

Figure 2:
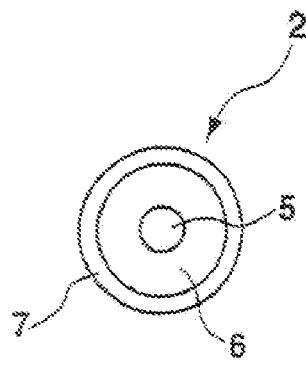
FIG. 2 shows a cross-section view of a laser fiber of the high-fiber laser amplifier of FIG. 1 taken along line II-II.

Referring to FIG. 2, the double-clad laser fiber 2 has a separate laser-active fiber core 5 with an outer diameter of at least 20 μm, a pump core 6 surrounding the fiber core 5 and having a diameter of at least 50 μm, and an outer pump cladding 7 that surrounds the pump core 6. The fiber core 5 consists of quartz glass that is doped with ytterbium and/or neodymium and emits in a range of 1060 to 1100 nm. The pump cladding 7 can be made of quartz glass. The fiber core 5 is designed such that the cross-sectional area of the fundamental mode has a maximum size, wherein a typical fundamental mode diameter is approximately 30 μm. The laser active fiber core provides a gain medium for simulated emission.

The pump cladding 7 can have an outer diameter of between about 100 μm and about 600 μm; an outer diameter of between about 100 μm and about 400 μm; or an outer diameter of between about 55 μm and about 2000 μm.

The refractive index differences between the fiber core 5 and the outer glass cladding 7 and between the pump core 6 and the outer glass cladding 7 are selected to enable wave guidance through the fiber 2. The refractive index differences are either achieved through suitable doping of the core and/or cladding quartz glass (e.g., the quartz glass can be doped with germanium for a high refractive index, or with flourine for a small refractive index) or through the structuring of the glass (e.g., the quartz glass can include periodically arranged air "pores", such as are found in a photonic crystal fiber (PCF)). The numerical aperture (N.A.) of the pump core 6 is in a range between 0.2 and 0.35 (for a quartz glass cladding). The numerical aperture can be adjusted through co-doping the fiber core 5. This is required for high ytterbium (Yb) doping in order to nevertheless achieve the fundamental mode even for large cross-sections.

Figure 3:
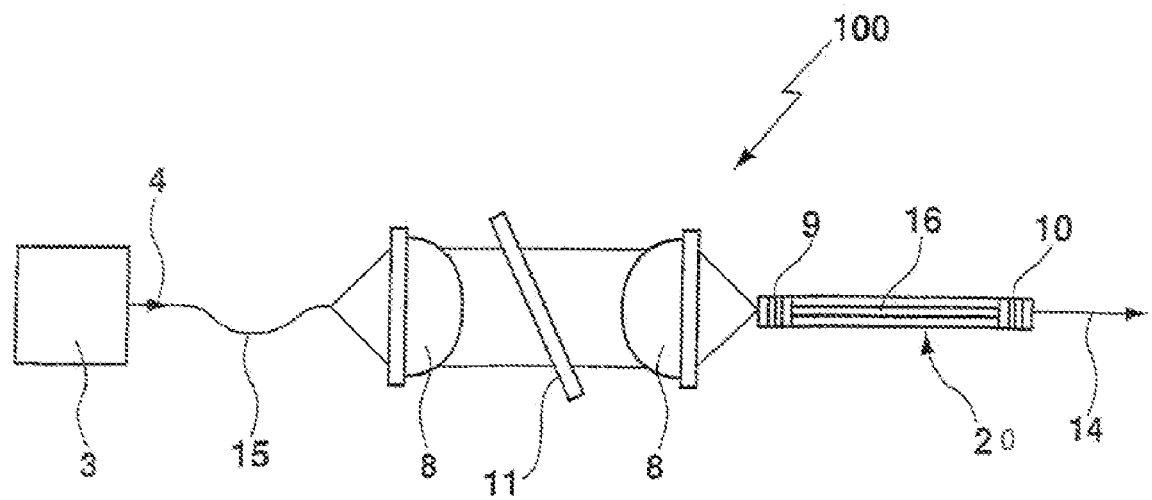
FIG. 3 shows a schematic drawing of a high-power fiber laser oscillator.

The laser fiber 2 can include structures 16 (e.g., as shown in FIG. 3) that are not rotationally symmetric and that induce tension (i.e., mechanical stress due to thermal expansion). The structures 16 can be a material with a thermal expansion coefficient that is different from that of the laser fiber 2 and can be of a particular direction.

The laser fiber 2 can be wound with a defined bending radius in order to increase the loss for the higher transverse modes to prevent swinging thereof. The active laser fiber 2 is cooled, which can, e.g., be effected through blowing air onto the laser fiber 2. Alternatively, a coaxial coolant (e.g., air) flow can be provided, or a coolant can be mounted on or embedded in a heat sink (e.g., water-cooled metal cylinder).

The pump light 4 is coupled on one side into the laser fiber 2 through a laser light cable 15 and lenses 8 or alternatively through a spliced passive fiber. Feedback to the solid state laser 3 is prevented by a dichroic mirror 11 that is disposed in a tilted position in the collimated pump beam. The amplified radiation 13 is generated in the fiber core 5 of the laser fiber 2 of the fiber laser amplifier 1 from non-amplified radiation 12, and the amplified radiation 13 is decoupled from the solid state laser 3 through the dichroic mirror 11.

Referring to FIG. 3, a high-power fiber laser oscillator 100 includes a double-clad laser fiber 20 and the solid state laser 3 for pumping the double-clad laser fiber 20. The laser fiber 20 includes an end mirror 9 at the pump laser side and a decoupling mirror 10 at the other side to form the fiber laser oscillator resonator. The end mirror 9 can be a fiber Bragg grating. The decoupling mirror 10 can be formed by a fiber Bragg grating or by a Fresnel reflection of an end surface of the fiber. Alternatively, the end mirror 9 and the decoupling mirror 10 can be designed as components separate from the core and cladding. There are different options for the design of the mirrors 9, 10: e.g., the mirrors 9, 10 can be in optical contact with the fiber end surface (butt coupling), the mirrors 9, 10 can be concave mirrors that are disposed in the distance of their radius of curvature from the fiber end, the mirrors 9, 10 can be plane mirrors in the collimated pump beam. The output laser beam 14 of the fiber laser oscillator 100 has a laser wavelength of 1060 to 1100 nm and an average laser power of more than 500 W with an almost diffraction-limited beam quality. The laser fiber 20 can have structures 16 that are not rotationally symmetric and induce tension in order to substantially maintain the polarization of the radiation that is coupled into the fiber core 5 and amplified.

The laser fiber 2, 20 can be integrated in a laser light cable or in the processing optics of a laser-processing machine that is disposed behind the laser light cable. The ytterbium-doped disc laser typically has several outlets for the output radiation. The fiber laser oscillator or amplifier is connected to one of these outlets. Further outlets can be connected through laser light cables directly to processing optics, such that the output radiation of the disc laser can be utilized as pump radiation for the fiber laser amplifier or oscillator and also directly for material processing. It is principally also possible to pump several fiber lasers with one single solid state laser either simultaneously by distributing the available pumping power, or consecutively.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A fiber laser amplifier with an average laser power of more than about 500 W, and an almost diffraction-limited beam quality ($M^2<1.5$), wherein the amplifier comprises:
 a double-clad laser fiber that comprises a separate laser-active fiber core having an outer diameter of at least about 20 μm, and a pump core surrounding the fiber core and having of an outer diameter of at least about 50 μm; and
 a ytterbium-doped solid state laser that emits pump light with a beam quality of $M^2<$ about 30, and a laser power of at least about 600 watts, for pumping the double-clad laser fiber.

2. The fiber laser amplifier of claim 1, wherein the solid state laser is a diode-pumped Yb:YAG disc laser.

3. The fiber laser amplifier of claim 1, wherein the fiber core includes quartz glass that is at least partially doped with laser-active ions.

4. The fiber laser amplifier of claim 1, wherein the fiber core is at least partially doped with ytterbium3+ ions.

5. The fiber laser amplifier of claim 1, wherein the fiber core is at least partially doped with neodymium3+.

6. The fiber laser amplifier of claim 1, wherein the fiber core is doped with both neodymium3+ ions and ytterbium 3+ ions, wherein the different ions are either provided in the same partial volume or are at least partially spatially separated.

7. The fiber laser amplifier of claim 1, wherein the laser active fiber core is at least partially doped with further ions, in particular Ge4+ or F−.

8. The fiber laser amplifier of claim 1, wherein the pump core includes quartz glass.

9. The fiber laser amplifier of claim 1, wherein the pump core is at least partially doped with ions, in particular Ge4+ or F−.

10. The fiber laser amplifier of claim 1, wherein the pump core defines periodically arranged, air-filled cavities.

11. The fiber laser amplifier of claim 1, wherein the laser fiber includes a pump cladding that surrounds the pump core.

12. The fiber laser amplifier of claim 11, wherein the pump cladding includes quartz glass.

13. The fiber laser amplifier of claim 11, wherein the pump cladding is at least partially doped with ions.

14. The fiber laser amplifier of claim 13, wherein the pump cladding is at least partially doped with F−.

15. The fiber laser amplifier of claim 11, wherein the pump cladding defines air-filled cavities.

16. The fiber laser amplifier of claim 11, wherein the pump cladding has an outer diameter of between about 100 μm and about 600 μm.

17. The fiber laser amplifier of claim 11, wherein the pump cladding has an outer diameter of between about 100 μm and about 400 μm.

18. The fiber laser amplifier of claim 11, wherein the pump cladding has an outer diameter of between about 55 μm and about 2000 μm.

19. The fiber laser amplifier of claim 1, wherein the outer diameter of the laser-active fiber core is smaller than approximately 50 μm.

20. The fiber laser amplifier of claim 1, wherein the outer diameter of the pump core is smaller than about 300 μm.

21. The fiber laser amplifier of claim 1, wherein the outer diameter of the pump core is smaller than about 200 μm.

22. The fiber laser amplifier of claim 1, wherein the numerical aperture of the pump core is between about 0.15 and about 0.7.

23. The fiber laser amplifier of claim 1, wherein the numerical aperture of the pump core is between about 0.2 and about 0.35.

24. The fiber laser amplifier of claim 1, wherein the laser fiber substantially maintains the polarization of the radiation that is coupled into the fiber core and amplified.

25. The fiber laser amplifier of claim 24, wherein the laser fiber includes structures that are rotationally asymmetric and that induce tension.

26. The fiber laser amplifier of claim 1, wherein the solid state laser is coupled to the laser fiber through an optical fiber.

27. The fiber laser amplifier of claim 1, further comprising a dichroic mirror that is disposed between the solid state laser and the laser fiber.

28. The fiber laser amplifier of claim 1, wherein the solid state laser is modulated.

29. The fiber laser amplifier of claim 1, wherein the solid state laser is Q-switched.

30. The fiber laser amplifier of claim 1, wherein:
 the fiber laser amplifier has a laser wavelength of about 1060 to about 1100 nm; and the solid state laser emits pump light with a wavelength of about 1030 nm.

31. A fiber laser oscillator with an average laser power of more than about 500 W and an almost diffraction-limited beam quality ($M^2 < 1.5$), the oscillator comprising:
  a double-clad laser fiber that comprises a separate laser-active fiber core having an outer diameter of at least about 20 µm, and a pump core surrounding the fiber core and having an outer diameter of at least about 50 µm;
  a ytterbium-doped solid state laser that emits pump light with a beam quality of $M^2 <$ about 30, and a laser power of at least about 600 watts, for pumping the double-clad laser fiber; and
  resonator mirrors at ends of the laser fiber for forming an oscillator.

32. The fiber laser oscillator of claim 31, wherein a first resonator mirror is disposed between the solid state laser and the laser fiber.

33. The fiber laser oscillator of claim 32, wherein the first resonator mirror is a dichroic mirror.

34. The fiber laser oscillator of claim 31, wherein at least one of the resonator mirrors is a fiber Bragg grating.

35. The fiber laser oscillator of claim 31, wherein:
  the fiber laser oscillator has a wavelength of about 1060 to about 1100 nm; and
  the solid state laser emits pump light with a wavelength of about 1030 nm.

36. A laser processing machine including a fiber laser oscillator as a processing laser, wherein the fiber laser oscillator has an average laser power of more than about 500 W and an almost diffraction-limited beam quality ($M^2 < 1.5$), the oscillator comprising:
  a double-clad laser fiber that comprises a separate laser-active fiber core having an outer diameter of at least about 20 µm, and a pump core surrounding the fiber core and having of an outer diameter of at least about 50 µm;
  an ytterbium-doped solid state laser that emits pump light with beam quality of $M^2 <$ about 30, and a laser power of at least about 600 watts, for pumping the double-clad laser fiber; and
  resonator mirrors at ends of the laser fiber for forming an oscillator.

37. The laser processing machine of claim 36, wherein the ytterbium-doped solid state laser is also provided directly for material processing.

38. The laser processing machine of claim 36, wherein:
  the fiber laser oscillator has a laser wavelength of about 1060 to about 1100 nm; and
  the solid state laser emits pump light with a wavelength of about 1030 nm.

* * * * *

UNITED STATES PATENT AND TRADEMARK OFFICE
CERTIFICATE OF CORRECTION

PATENT NO. : 7,369,582 B2
APPLICATION NO. : 11/567010
DATED : May 6, 2008
INVENTOR(S) : Malte Kumkar and Andreas Voss It is certified that error appears in the above-identified patent and that said Letters Patent is hereby corrected as shown below:

On the cover page, first inventor's name is --Malte-- not "Maite";

On cover page in the abstract, before "ytterbium" insert --an--;

At column 7, claim 1, line 55, delete "a" and insert --an--;

At column 7, claim 4, line 65, delete "ytterbium3+" and insert --ytterbium$^{3+}$--;

At column 7, claim 5, line 67, delete "neodymium3+" and insert --neodymium$^{3+}$--;

At column 8, claim 6, lines 3-4, delete "neodymium3+ ion and ytterbium 3+ ions" and insert --neodymium$^{3+}$ ions and ytterbium$^{3+}$ ions--;

At column 8, claim 7, lines 6-7, delete "laser active" and insert --laser-active--;

At column 8, claim 7, line 8, delete "Ge4+ or F-" and insert --Ge$^{4+}$ or F$^-$--;

At column 8, claim 9, lines 12-13, delete "Ge4+ or F-" and insert --Ge$^{4+}$ or F$^-$--;

At column 8, claim 14, line 24, delete "F-" and insert --F$^-$--;

At column 9, claim 31, line 9, after "having" insert --of--;

At column 9, claim 31, line 11, delete "a" and insert --an--;

UNITED STATES PATENT AND TRADEMARK OFFICE
CERTIFICATE OF CORRECTION

PATENT NO. : 7,369,582 B2
APPLICATION NO. : 11/567010
DATED : May 6, 2008
INVENTOR(S) : Malte Kumkar and Andreas Voss It is certified that error appears in the above-identified patent and that said Letters Patent is hereby corrected as shown below:

At column 9, claim 35, line 25, after "a" insert --laser--;

Signed and Sealed this

Twenty-first Day of October, 2008

JON W. DUDAS
*Director of the United States Patent and Trademark Office*